(12) United States Patent
Horiuchi (10) Patent No.: US 11,524,456 B2
(45) Date of Patent: Dec. 13, 2022

(54) METHOD OF FABRICATING SHAPED OBJECT AND FORMING APPARATUS

(71) Applicant: CASIO COMPUTER CO., LTD., Tokyo (JP)

(72) Inventor: Yuji Horiuchi, Higashiyamato (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 300 days.

(21) Appl. No.: 16/879,835

(22) Filed: May 21, 2020

(65) Prior Publication Data
US 2020/0391435 A1    Dec. 17, 2020

(30) Foreign Application Priority Data

Jun. 14, 2019 (JP) .............................. JP2019-110797

(51) Int. Cl.
*B29C 64/165* (2017.01)
*B29C 64/141* (2017.01)
(Continued)

(52) U.S. Cl.
CPC ............ *B29C 64/268* (2017.08); *B29C 44/00* (2013.01); *B29C 64/141* (2017.08);
(Continued)

(58) Field of Classification Search
CPC ... B29C 64/165; B29C 64/141; B29C 64/245; B29C 64/268; B29C 64/295;
(Continued)

(56) References Cited

U.S. PATENT DOCUMENTS

| 8,643,687 B2 | 2/2014 | Horiuchi |
| 9,492,956 B2 | 11/2016 | Horiuchi |

(Continued)

FOREIGN PATENT DOCUMENTS

| JP | S57131530 A | 8/1982 |
| JP | S59035359 B2 | 8/1984 |

(Continued)

OTHER PUBLICATIONS

Japanese Office Action (and English language translation thereof) dated Jul. 6, 2021 issued in counterpart Japanese Application No. 2019-110797.

(Continued)

*Primary Examiner* — Matthew Luu
*Assistant Examiner* — Kendrick X Liu
(74) *Attorney, Agent, or Firm* — Holtz, Holtz & Volek PC (57) ABSTRACT

A method of fabricating a shaped object includes: preparing a formation sheet including a base and a thermally expansive layer stacked on a first main surface of the base, the thermally expansive layer including a binder and thermally expandable material; heating the base of the formation sheet to a temperature lower than an expansion initiation temperature at which the thermally expandable material starts to expand; and heating the thermally expansive layer of the formation sheet after heating of the base, to a temperature higher than or equal to the expansion initiation temperature at which the thermally expandable material starts to expand, thereby causing expansion of the thermally expansive layer.

10 Claims, 10 Drawing Sheets

(51) Int. Cl.
  *B29C 64/245* (2017.01)
  *B29C 64/268* (2017.01)
  *B29C 64/295* (2017.01)
  *B29C 64/236* (2017.01)
  *B29C 64/393* (2017.01)
  *B41M 5/26* (2006.01)
  *B41M 7/00* (2006.01)
  *B29C 44/00* (2006.01)
  *B33Y 50/02* (2015.01)
  *B33Y 10/00* (2015.01)
  *B33Y 30/00* (2015.01)

(52) U.S. Cl.
  CPC .......... *B29C 64/165* (2017.08); *B29C 64/236* (2017.08); *B29C 64/245* (2017.08); *B29C 64/295* (2017.08); *B29C 64/393* (2017.08); *B41M 5/26* (2013.01); *B41M 7/009* (2013.01); *B33Y 10/00* (2014.12); *B33Y 30/00* (2014.12); *B33Y 50/02* (2014.12)

(58) Field of Classification Search
  CPC ..... B29C 64/236; B29C 64/393; B29C 44/00; B41M 5/26; B41M 7/009; B33Y 10/00; B33Y 30/00; B33Y 50/02
  See application file for complete search history.

(56) References Cited

U.S. PATENT DOCUMENTS

| | | |
|---|---|---|
| 9,522,490 B2 | 12/2016 | Horiuchi et al. |
| 9,579,833 B2 | 2/2017 | Horiuchi |
| 10,005,208 B2 | 6/2018 | Horiuchi |
| 10,414,076 B2 | 9/2019 | Horiuchi |
| 2013/0280498 A1 | 10/2013 | Horiuchi et al. |
| 2018/0037033 A1* | 2/2018 | Tamura ............ B41J 3/60 |
| 2018/0162054 A1 | 6/2018 | Horiuchi et al. |
| 2018/0272781 A1 | 9/2018 | Takahashi et al. |
| 2018/0274087 A1 | 9/2018 | Takahashi et al. |
| 2019/0283285 A1 | 9/2019 | Motoyanagi et al. |
| 2019/0329577 A1 | 10/2019 | Takahashi et al. |
| 2020/0034505 A1 | 1/2020 | Iwamoto et al. |

FOREIGN PATENT DOCUMENTS

| | | | |
|---|---|---|---|
| JP | 2001113826 A | * | 4/2001 |
| JP | 2001113826 A | | 4/2001 |
| JP | 2018099875 A | | 6/2018 |
| JP | 2018161791 A | | 10/2018 |

OTHER PUBLICATIONS

U.S. Appl. No. 16/525,394; First Named Inventor: Kenji Iwamoto; Title: "Thermally Expandable Sheet and Method of Producing Three-Dimensional Object"; filed Jul. 29, 2019.

U.S. Appl. No. 16/718,145; First Named Inventor: Yuji Horiuchi; Title: "Setting Apparatus, Shaping System, Setting Method, and Computer-Readable Recording Medium"; filed Dec. 17, 2019.

U.S. Appl. No. 16/718,154; First Named Inventor: Yuji Horiuchi; Title: "Display Apparatus, Shaping System, Display Method, and Computer-Readable Recording Medium"; filed Dec. 17, 2019.

\* cited by examiner

METHOD OF FABRICATING SHAPED OBJECT AND FORMING APPARATUS

CROSS-REFERENCE TO RELATED APPLICATION

This application claims the benefit of Japanese Patent Application No. 2019-110797, filed on Jun. 14, 2019, the entire disclosure of which is incorporated by reference herein.

FIELD

This application relates to a method of fabricating a shaped object and a forming apparatus.

BACKGROUND

Techniques for providing a three-dimensional image from a thermally expandable sheet have been known (for example, Examined Japanese Patent Application Publication No. S59-35359). The fabrication method disclosed in Examined Japanese Patent Application Publication No. S59-35359 involves the first step of providing an image using a highly light absorbing material to a thermally expandable sheet composed of a base layer and a foaming layer containing thermally expandable microspheres. In the second step, the thermally expandable sheet provided with the image is irradiated with light, so that the image portions are selectively heated to be raised.

However, the fabrication method disclosed in Examined Japanese Patent Application Publication No. S59-35359 may cause a phenomenon where the heat for heating the image portions is unintentionally diffused or absorbed by the base layer. This phenomenon leads to an insufficient temperature rise in the foaming layer, resulting in a reduction in height of the raised portions (protrusions). For example, a thick base layer diffuses or absorbs most of the heat generated by light irradiation, thereby reducing the height of the raised portions.

An objective of the disclosure, which has been accomplished in view of the above situation, is to provide a method of fabricating a shaped object and a forming apparatus that can readily fabricate a shaped object having high protrusions.

SUMMARY

A method of fabricating a shaped object includes: preparing a formation sheet including a base and a thermally expansive layer stacked on a first main surface of the base, the thermally expansive layer including a binder and thermally expandable material; heating the base of the formation sheet to a temperature lower than an expansion initiation temperature at which the thermally expandable material starts to expand; and heating the thermally expansive layer of the formation sheet after heating of the base, to a temperature higher than or equal to the expansion initiation temperature at which the thermally expandable material starts to expand, thereby causing expansion of the thermally expansive layer.

A forming apparatus for fabricating a shaped object from a formation sheet including a base and a thermally expansive layer stacked on a first main surface of the base, the thermally expansive layer including a binder and thermally expandable material. The forming apparatus includes: a heating unit configured to heat the base of the formation sheet to a temperature lower than an expansion initiation temperature at which the thermally expandable material starts to expand; and an expanding unit configured to heat the thermally expansive layer of the formation sheet to a temperature higher than or equal to the expansion initiation temperature at which the thermally expandable material starts to expand, thereby causing expansion of the thermally expansive layer.

BRIEF DESCRIPTION OF THE DRAWINGS

A more complete understanding of this application can be obtained when the following detailed description is considered in conjunction with the following drawings, in which.

DETAILED DESCRIPTION

A method of fabricating a shaped object according to embodiments of the disclosure will now be explained with reference to the accompanying drawings.

Embodiment 1

In this embodiment, a shaped object 100 is fabricated from a formation sheet 10. The shaped object 100 is used as a decorative paper or wallpaper, for example. In the present disclosure, the term "shaped object" indicates a sheet having unevennesses shaped (formed) on a certain surface. The unevennesses constitute geometric shapes, characters, patterns, or decorations, for example. The term "decoration" refers to an object that allows people appeals to the aesthetic sense through visual and/or tactile sensation. The term "to shape (or to form)" refers to creating an object having a shape and also encompasses the concepts of adding decorations and generating decorations. Although the shaped object 100 according to the embodiment is a three-dimensional object having unevennesses on a certain surface, to distinguish this three-dimensional object from a three-dimensional object fabricated by a so-called 3D printer, the shaped object 100 of the embodiment is also called a 2.5-dimensional (2.5D) object or a pseudo-three-dimensional (pseudo-3D) object. The technique for fabricating the shaped object 100 according to the embodiment is also called a 2.5D printing technique or a pseudo-3D printing technique.

Figure 1:
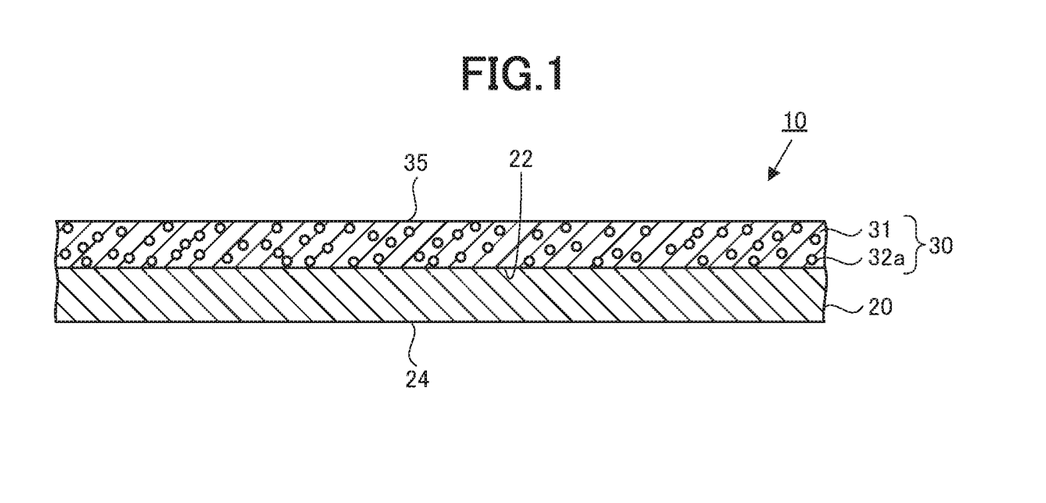
FIG. 1 is a schematic sectional view of a formation sheet according to Embodiment 1 of the disclosure.

The formation sheet 10 will now be described with reference to FIG. 1. The formation sheet 10 is composed of a base 20 and a thermally expansive layer 30 stacked on a first main surface 22 of the base 20, as illustrated in FIG. 1. In this embodiment, the thermally expansive layer 30 covers the entire first main surface 22.

The base 20 of the formation sheet 10 has the first main surface 22 provided with the thermally expansive layer 30 thereon and a second main surface 24 opposite to the first main surface 22. The base 20 supports the thermally expansive layer 30. The base 20 has a shape of sheet, for example. Exemplary materials of the base 20 include thermoplastic resins, such as polyolefin resins (for example, polyethylene (PE) and polypropylene (PP)) and polyester resins (for example, polyethylene terephthalate (PET) and polybutylene terephthalate (PBT)). The type of the material of the base 20 and the thickness of the base 20 are selected according to the application of the shaped object 100.

The thermally expansive layer 30 of the formation sheet 10 is stacked on the first main surface 22 of the base 20. The thermally expansive layer 30 contains a binder 31 and thermally expandable material (that is, unexpanded thermally expandable material) 32a dispersed in the binder 31. The binder 31 is composed of any thermoplastic resin, such as a vinyl acetate polymer or acrylic polymer. The thermally expandable material 32a is expandable by being heated to a temperature of at least a predetermined temperature, to the size depending on the amount of heat (specifically, depending on a heating temperature or heating period, for example). The thermally expandable material 32a is expanded when being heated to a temperature of at least 80° C. to 120° C., for example. In the following description, the temperature at which the thermally expandable material 32a starts to expand is referred to as "expansion initiation temperature". A typical example of the thermally expandable material particle 32a is a thermally expandable microcapsule.

The thermally expandable microcapsule is formed by enclosing a foaming agent composed of a low boiling point substance, such as propane or butane, in a thermoplastic resin shell. Exemplary materials of the shell of the thermally expandable microcapsule include thermoplastic resins, such as polystyrene, polyvinyl chloride, polyvinylidene chloride, polyvinyl acetate, polyacrylic acid ester, polyacrylonitrile, polybutadiene, and copolymers thereof. The heating of the thermally expandable microcapsule to a temperature of at least the predetermined temperature (expansion initiation temperature) causes softening of the shell and evaporation of the foaming agent. The evaporation of the foaming agent increases the pressure in the shell and causes the shell to expand like a balloon. The thermally expandable microcapsule expands to the particle size approximately five times larger than the particle size of the unexpanded microcapsule. The average particle size of the unexpanded thermally expandable microcapsules is 5 to 50 μm, for example.

The expansion of the thermally expandable material 32a causes distension of the thermally expansive layer 30 of the formation sheet 10. This process also causes unevennesses 110 (described later) to be provided on a surface 35 of the thermally expansive layer 30 opposite to the base 20.

(Shaped Object)

Figure 2:
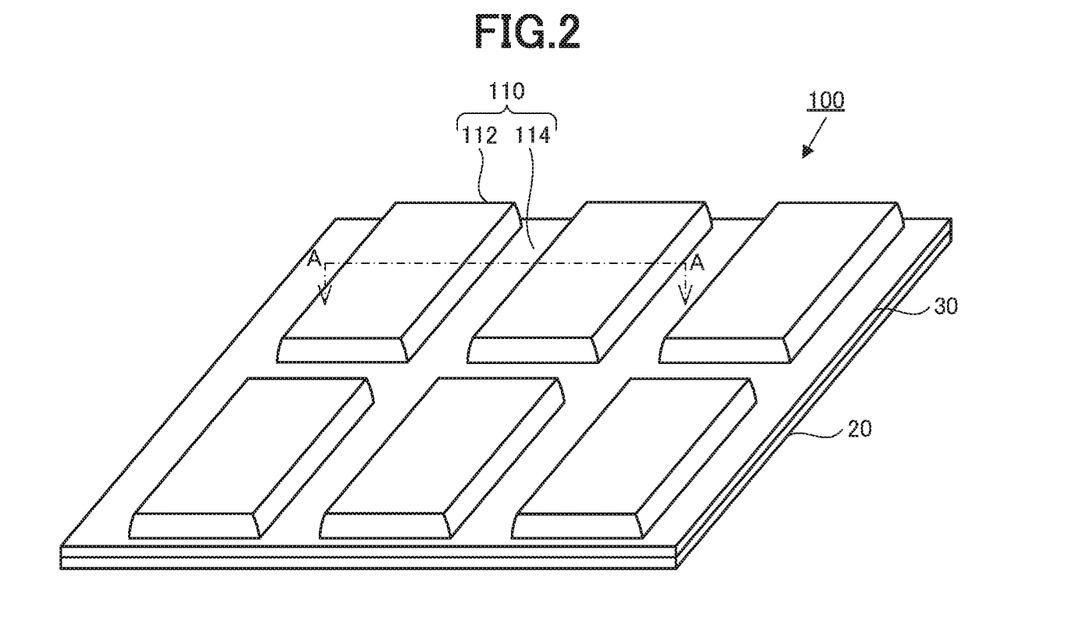
FIG. 2 is a perspective view of a shaped object according to Embodiment 1 of the disclosure.

The shaped object 100 will now be described with reference to FIGS. 2 and 3. The shaped object 100 includes the base 20, and the thermally expansive layer 30 stacked on the first main surface 22 of the base 20 and provided with the unevennesses 110 on the surface opposite to the base 20, as illustrated in FIGS. 2 and 3.

The shaped object 100 has a shape of sheet. The shaped object 100 has the unevennesses 110 on the surface thereof. Since the base 20 of the shaped object 100 has the configuration identical to that of the base 20 of the formation sheet 10, the following description is directed to the thermally expansive layer 30 of the shaped object 100.

Figure 3:
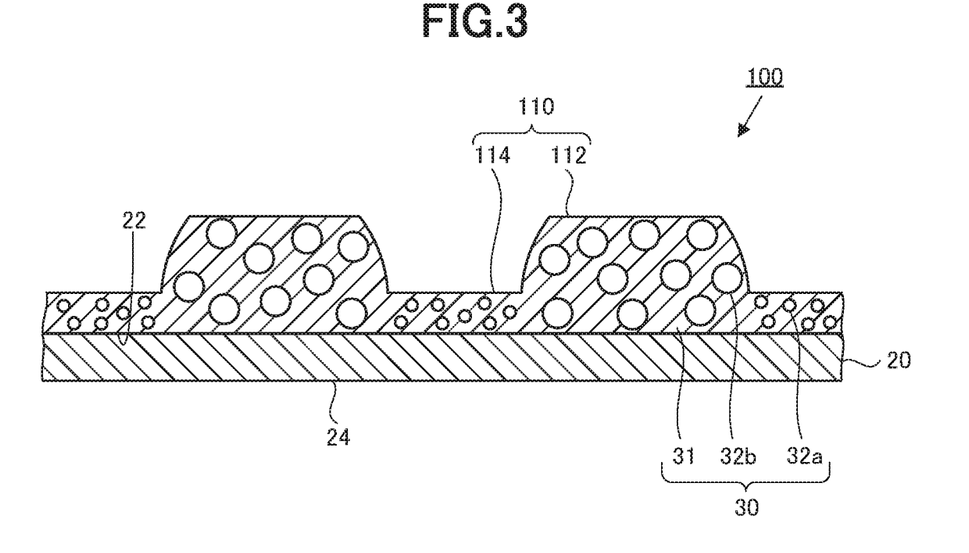
FIG. 3 is a sectional view of the shaped object illustrated in FIG. 2 as viewed along the line A-A.

The thermally expansive layer 30 of the shaped object 100 contains the binder 31, the thermally expandable material (that is, unexpanded thermally expandable material) 32a, and expanded thermally expandable material 32b, as illustrated in FIG. 3. The binder 31 in the thermally expansive layer 30 of the shaped object 100 is identical to the binder 31 in the thermally expansive layer 30 of the formation sheet 10. Also, the thermally expandable material 32a in the thermally expansive layer 30 of the shaped object 100 is identical to the thermally expandable material 32a in the thermally expansive layer 30 of the formation sheet 10. The expanded thermally expandable material 32b indicates the thermally expandable material 32a that has expanded by being heated to a temperature higher than or equal to the expansion initiation temperature. The unevennesses 110 on the thermally expansive layer 30 are composed of protrusions 112 containing the expanded thermally expandable material 32b and recesses 114 containing the unexpanded thermally expandable material 32a.

(Method of Fabricating the Shaped Object)

Figure 4:
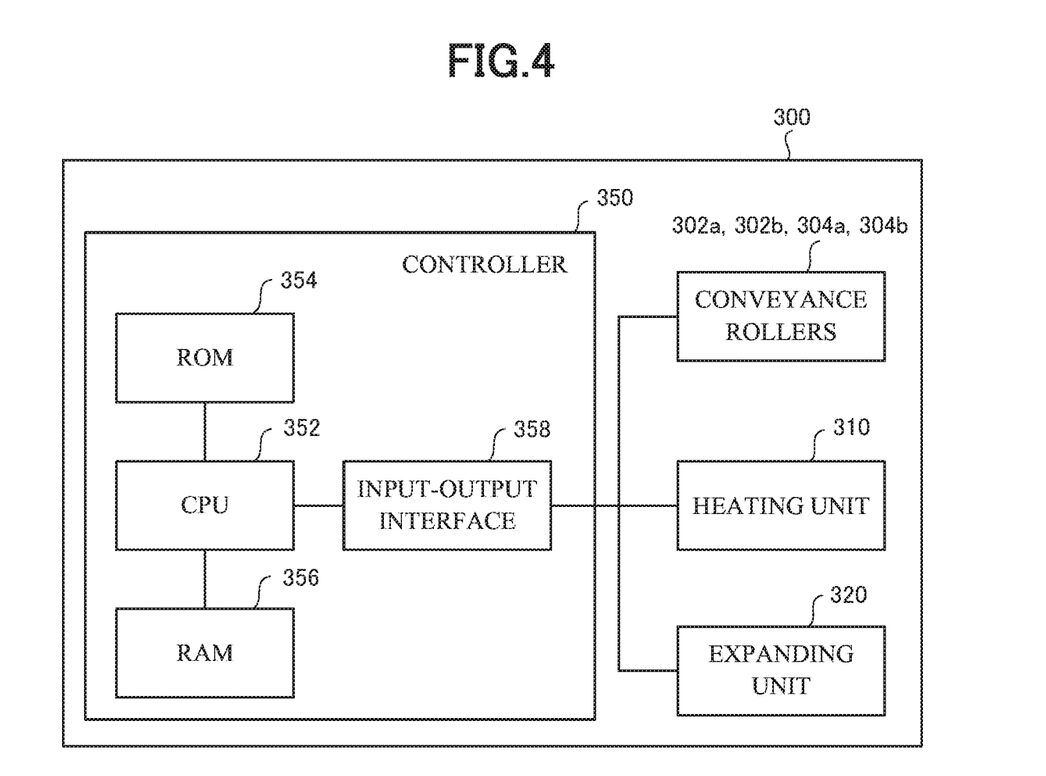
FIG. 4 illustrates a hardware configuration of a forming apparatus according to Embodiment 1 of the disclosure.
Figure 5:
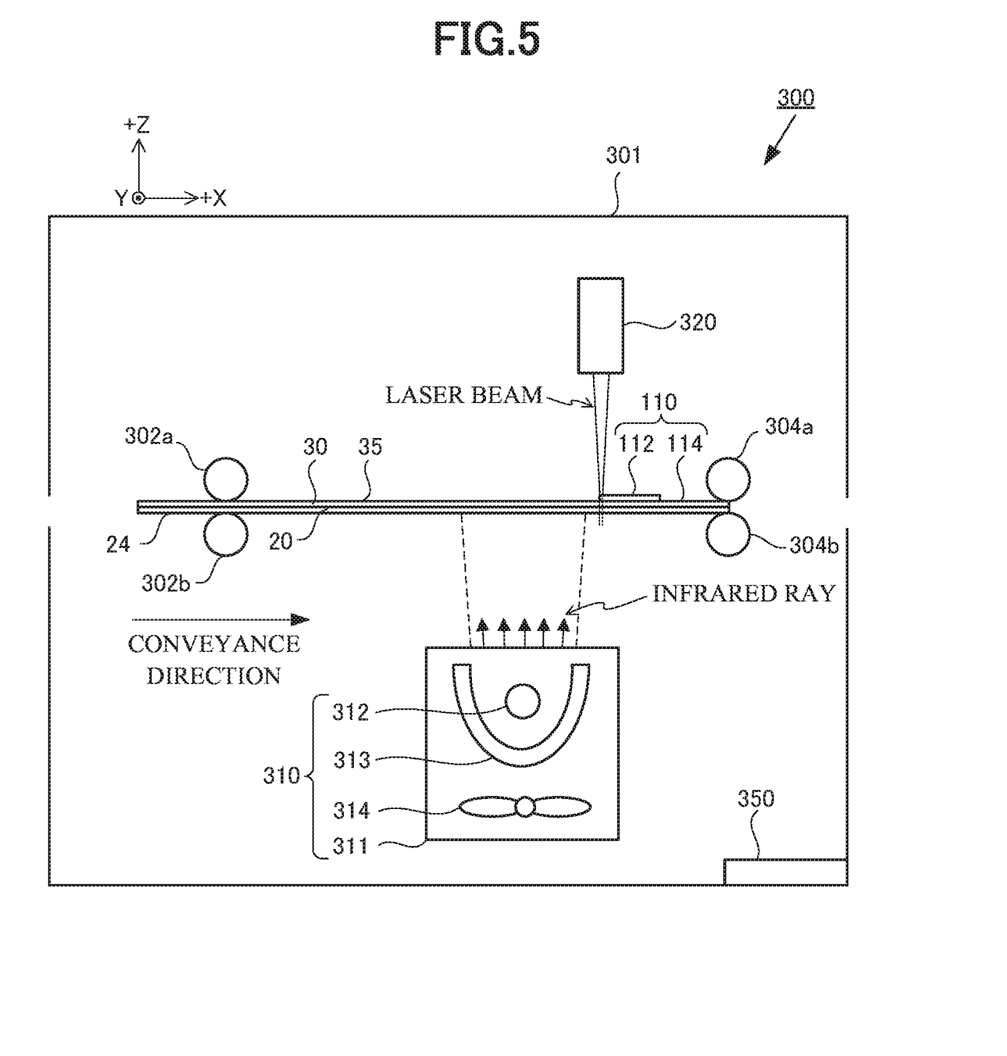
FIG. 5 is a schematic view of the forming apparatus according to Embodiment 1 of the disclosure.
Figure 6:
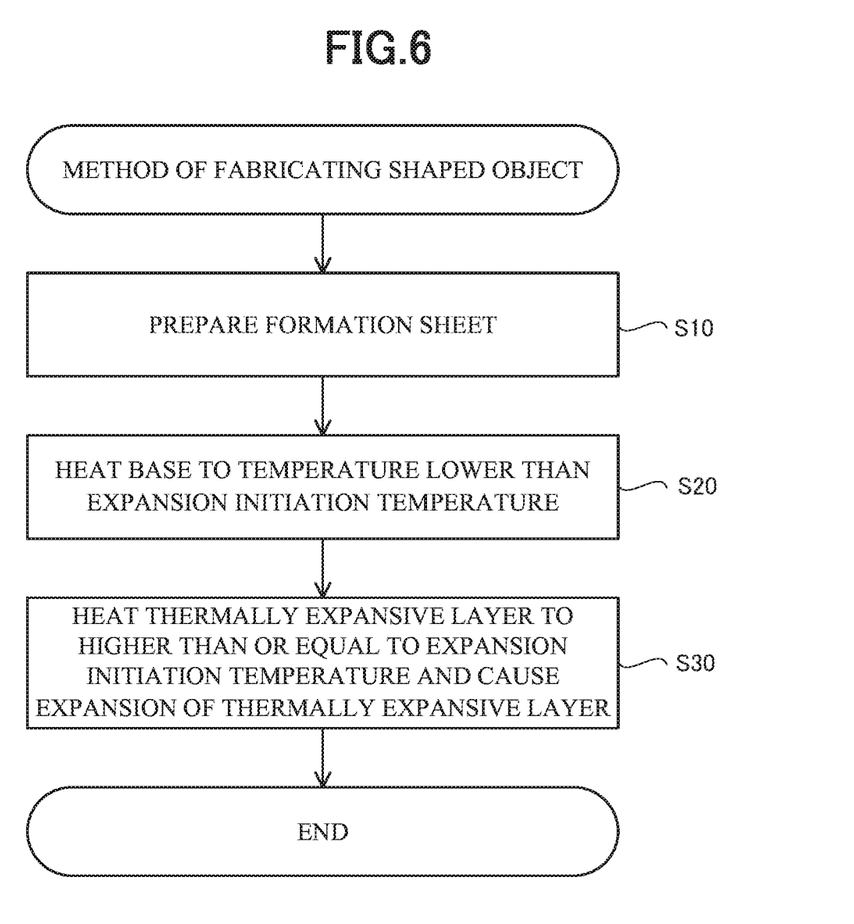
FIG. 6 is a flowchart illustrating a method of fabricating the shaped object according to Embodiment 1 of the disclosure.

A method of fabricating the shaped object 100 will now be explained with reference to FIGS. 4 to 6. In this embodiment, the shaped object 100 is fabricated from the formation sheet 10 having a shape of sheet (for example, A4-size sheet).

A forming apparatus 300 used in the method of fabricating the shaped object 100 will be described. The forming apparatus 300 fabricates the shaped object 100 from the formation sheet 10. The forming apparatus 300 is equipped with a metal housing 301 having a box shape and components accommodated therein, as illustrated in FIGS. 4 and 5. The components include conveyance rollers 302a, 302b, 304a, and 304b for conveying the formation sheet 10 along a conveyance path, a heating unit 310 for heating the base 20 of the formation sheet 10, an expanding unit 320 for causing expansion of the thermally expansive layer 30 of the formation sheet 10, and a controller 350 for controlling these components. In order to facilitate an understanding, the longitudinal right direction of the forming apparatus 300 (the direction toward the right of FIG. 5) is defined as +X direction, the upward direction (the direction toward the top of FIG. 5) is defined as +Z direction, and the direction perpendicular to the +X and +Z directions (the direction apart from FIG. 5) is defined as +Y direction in the present disclosure.

The conveyance rollers 302a, 302b, 304a, and 304b of the forming apparatus 300 serve as a conveyance unit. The pair of conveyance rollers 302a and 302b are opposed to each other while the pair of conveyance rollers 304a and 304b are opposed to each other, to hold the formation sheet 10 therebetween, as illustrated in FIG. 5. The conveyance rollers 302a, 302b, 304a, and 304b rotate to convey the formation sheet 10 from the −X side in the +X direction.

In this embodiment, the formation sheet 10 is conveyed from the −X side in the +X direction while being guided by a conveyance guide (not shown), such that the thermally expansive layer 30 faces the +Z direction and the second main surface 24 of the base 20 faces the −Z direction.

The heating unit 310 of the forming apparatus 300 heats the base 20 of the formation sheet 10 during conveyance to a temperature lower than the expansion initiation temperature. Specifically, the heating unit 310 emits infrared rays (electromagnetic waves) to the base 20 of the formation sheet 10 during conveyance, from the side (−Z side) adjacent to the base 20 of the formation sheet 10, to heat the base 20 to a temperature lower than the expansion initiation temperature. In this embodiment, the heating unit 310 is located on the −Z side of the conveyance path of the formation sheet 10 and emits an infrared ray from the −Z side, that is, the side adjacent to the base 20.

The heating unit 310 is an infrared lamp heater, for example, and includes a cover 311, a lamp 312, a reflective plate 313, and a fan 314. The cover 311 accommodates the lamp 312, the reflective plate 313, and the fan 314. A typical example of the lamp 312 is a straight infrared lamp. The lamp 312 emits an infrared ray to the base 20 of the formation sheet 10. The infrared ray from the lamp 312 is reflected by the reflective plate 313 to the base 20 of the formation sheet 10. The fan 314 supplies air into the cover 311 to cool the lamp 312 and the reflective plate 313.

The expanding unit 320 of the forming apparatus 300 heats the thermally expansive layer 30 of the formation sheet 10 to a temperature higher than or equal to the expansion initiation temperature to cause expansion of the thermally expansive layer 30. Specifically, the expanding unit 320 emits a laser beam (for example, carbon dioxide laser beam) to the thermally expansive layer 30 of the formation sheet 10 during conveyance subsequent to heating of the base 20 by the heating unit 310. The thermally expansive layer 30 is thus heated to a temperature higher than or equal to the expansion initiation temperature and expands according to expansion of the thermally expandable material 32a and formation of the expanded thermally expandable material 32b in the thermally expansive layer 30. In this embodiment, the expanding unit 320 is located on the +Z side of the conveyance path of the formation sheet 10 and emits a laser beam from the +Z side, that is, the side adjacent to the thermally expansive layer 30. The expanding unit 320 is more adjacent to the +X side than the heating unit 310.

The expanding unit 320 is a carbon dioxide laser emitter, for example. The expanding unit 320 includes a carbon dioxide laser oscillator, a polygon mirror, and a lens (which are not shown). The expanding unit 320 causes the polygon mirror to reflect the carbon dioxide laser beam oscillated by the carbon dioxide laser oscillator to scan the carbon dioxide laser beam in the +Y and −Y directions, so as to direct the carbon dioxide laser beam to areas of the thermally expansive layer 30 to be provided with the protrusions 112.

The controller 350 of the forming apparatus 300 controls the conveyance rollers 302a, 302b, 304a, and 304b, the heating unit 310, and the expanding unit 320. With reference to FIG. 4, the controller 350 includes a central processing unit (CPU) 352 for executing various operations, a read only memory (ROM) 354 for preliminarily storing programs and data, a random access memory (RAM) 356 for storing data, and an input-output interface 358 for inputting and outputting signals between the components. The functions of the controller 350 are achieved by execution of the programs stored in the ROM 354 by the CPU 352. The input-output interface 358 enables signals to be input and output between the CPU 352 and the conveyance rollers 302a, 302b, 304a, and 304b, the heating unit 310, or the expanding unit 320.

The method of fabricating the shaped object 100 will be explained. FIG. 6 is a flowchart illustrating the method of fabricating the shaped object 100. The method of fabricating the shaped object 100 involves a preparation step (Step S10) of preparing the formation sheet 10 including the base 20 and the thermally expansive layer 30 stacked on the first main surface 22 of the base 20 and composed of the binder 31 and the thermally expandable material 32a; a base heating step (Step S20) of heating the base 20 of the formation sheet 10 to a temperature lower than the expansion initiation temperature; and an expansion step (Step S30) of heating the thermally expansive layer 30 of the formation sheet 10 after heating of the base 20, to a temperature higher than or equal to the expansion initiation temperature, and thereby causing expansion of the thermally expansive layer 30.

In the preparation step (Step S10), the formation sheet 10 is prepared. For example, a coating solution composed of a mixture of the binder 31 and the thermally expandable material 32a is screen-printed on the first main surface 22 of the base 20. The printed coating solution is then dried. This process yields the formation sheet 10.

In the base heating step (Step S20), the formation sheet 10 is installed in the forming apparatus 300. While the formation sheet 10 is being conveyed, the heating unit 310 of the forming apparatus 300 emits an infrared ray to the base 20 of the formation sheet 10 to heat the base 20 to a temperature lower than the expansion initiation temperature. The base 20 should preferably be heated to a temperature of at least 40° C. in order to prevent the heat for expansion of the thermally expansive layer 30 from being diffused to the base 20 in the expansion step (Step S30). Furthermore, the base 20 should preferably be heated to a temperature 5° C. or more lower than the expansion initiation temperature in order to prevent unintended expansion of the thermally expansive layer 30 in the base heating step. The temperature of the base 20 can be adjusted by controlling a rate of conveyance of the formation sheet 10 and an amount of energy of the infrared ray emitted from the heating unit 310 per unit area and unit time.

In the expansion step (Step S30), while the formation sheet 10 after heating of the base 20 is being conveyed, the expanding unit 320 of the forming apparatus 300 emits a laser beam to the thermally expansive layer 30 of the formation sheet 10 after heating of the base 20, to heat the thermally expansive layer 30 to a temperature higher than or equal to the expansion initiation temperature. This heating causes expansion of the thermally expandable material 32a in the thermally expansive layer 30 and formation of the expanded thermally expandable material 32b, resulting in expansion of the thermally expansive layer 30. The expansion of the thermally expansive layer 30 provides the unevennesses 110 on the surface 35 of the thermally expansive layer 30, as illustrated in FIG. 5.

The shapes of the unevennesses 110 and the heights of the protrusions 112 of the unevennesses 110 can be adjusted by controlling the strength and pattern of the laser beam emitted from the expanding unit 320 to the thermally expansive layer 30. In this embodiment, the preheating of the base 20 to a temperature lower than the expansion initiation temperature can prevent the heat fed to the thermally expansive layer 30 by laser beam irradiation from being diffused to the base 20, thereby providing higher protrusions 112. In particular, an existing method of fabricating a shaped object 100 from a formation sheet 10 including a thick base 20 (having a thickness of 1 mm or more, for example) cannot readily provide high protrusions 112 because of a large amount of heat diffused from the thermally expansive layer 30 to the base 20. The fabrication method according to the embodiment can achieve fabrication of the shaped object 100 having high protrusions 112 from the formation sheet 10 including the thick base 20 by preventing heat diffusion to the base 20.

This process can produce the shaped object 100.

In the base heating step (Step S20) of the method of fabricating the shaped object 100, the base 20 of the formation sheet 10 is heated to the temperature lower than the expansion initiation temperature, as explained above. This configuration can prevent the heat for expansion of the thermally expansive layer 30 of the formation sheet 10 from being diffused to the base 20 in the expansion step (Step S30), thereby providing higher protrusions 112. The method according to the embodiment can thus readily achieve fabrication of the shaped object 100 having high protrusions 112. Furthermore, the thermally expansive layer 30 is heated along with the base 20 in the base heating step (Step S20). This heating causes softening of the binder 31 in the thermally expansive layer 30, which contributes to further increases in height of the protrusions 112.

In this embodiment, the heating unit 310 of the forming apparatus 300 heats the base 20 of the formation sheet 10 to a temperature lower than the expansion initiation temperature. In addition, the expanding unit 320 of the forming apparatus 300 heats the thermally expansive layer 30 of the formation sheet 10 after heating of the base 20, to a temperature higher than or equal to the expansion initiation temperature, to cause expansion of the thermally expansive layer 30. The forming apparatus 300 is therefore able to prevent the heat for expansion of the thermally expansive layer 30 from being diffused to the base 20 and readily fabricate the shaped object 100 having high protrusions 112.

Embodiment 2

Although the heating unit 310 of the forming apparatus 300 emits an infrared ray to the base 20 of the formation sheet 10 to heat the base 20 in Embodiment 1, the heating unit 310 may have another configuration. Although the expanding unit 320 of the forming apparatus 300 emits a laser beam to the thermally expansive layer 30 of the formation sheet 10 to cause expansion of the thermally expansive layer 30 in Embodiment 1, expansion of the thermally expansive layer 30 may be caused by other mechanism.

Since a formation sheet 10 according to this embodiment is identical to the formation sheet 10 according to Embodiment 1, the following description is directed to a shaped object 100 and a method of fabricating the shaped object 100 according to this embodiment.

Figure 7:
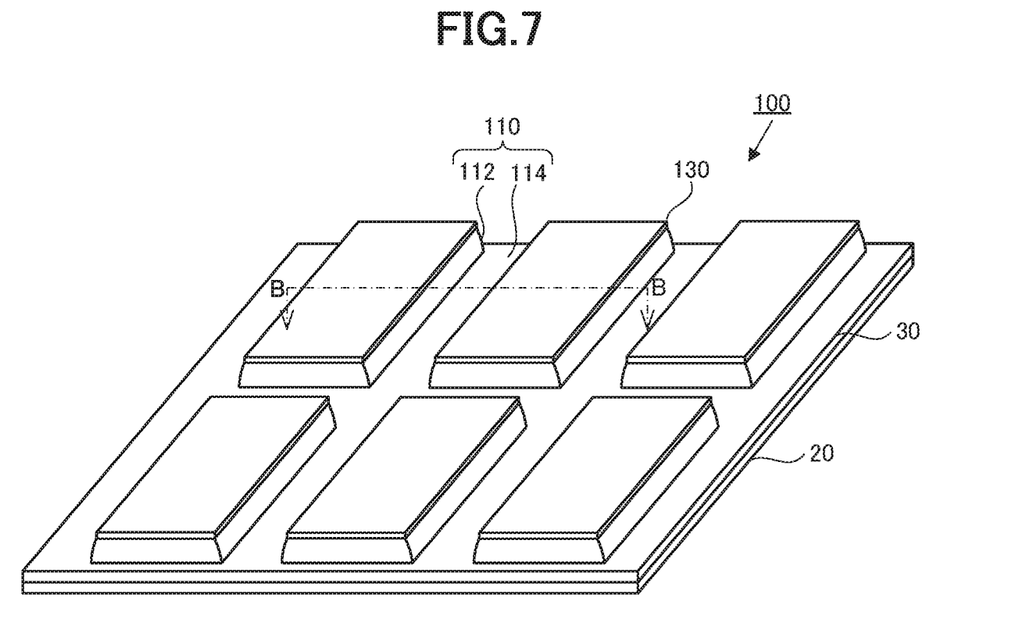
FIG. 7 is a perspective view of a shaped object according to Embodiment 2 of the disclosure.
Figure 8:
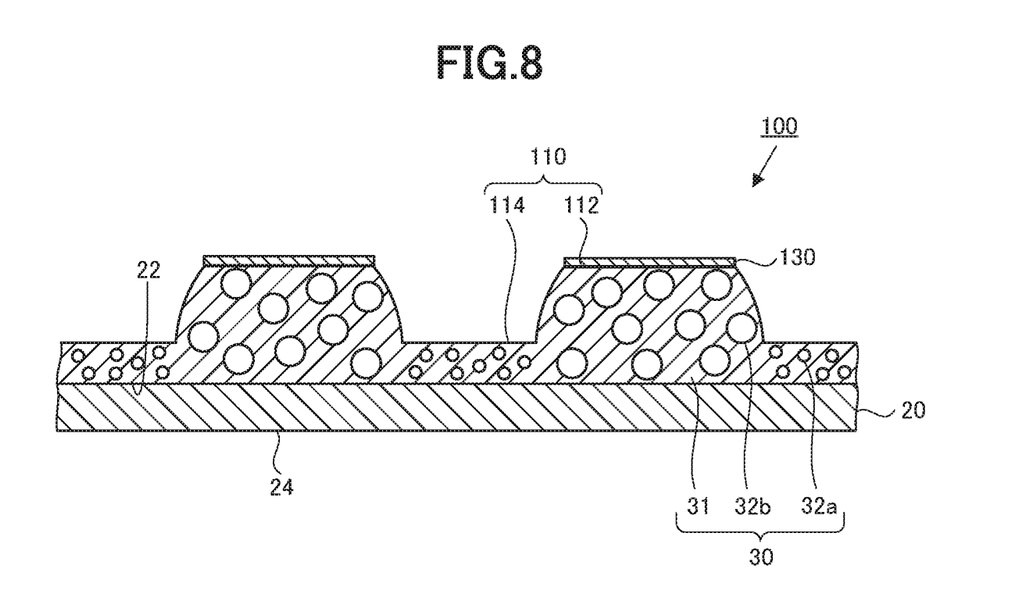
FIG. 8 is a sectional view of the shaped object illustrated in FIG. 7 as viewed along the line B-B.

With reference to FIGS. 7 and 8, the shaped object 100 according to the embodiment includes a base 20, a thermally expansive layer 30 stacked on a first main surface 22 of the base 20 and provided with unevennesses 110 on the surface opposite to the base 20, and a thermal conversion layer 130 stacked on the thermally expansive layer 30.

The shaped object 100 according to the embodiment has a shape of sheet, like the shaped object 100 according to Embodiment 1. The shaped object 100 according to the embodiment has the unevennesses 110 on the surface thereof. The unevennesses 110 are composed of protrusions 112 and recesses 114, as in Embodiment 1. Since the base 20 and the thermally expansive layer 30 of the shaped object 100 according to this embodiment are identical to the base 20 and the thermally expansive layer 30 of the shaped object 100 according to Embodiment 1, the following description is directed to the thermal conversion layer 130.

The thermal conversion layer 130 of the shaped object 100 is disposed on the protrusions 112 of the thermally expansive layer 30. The thermal conversion layer 130 is stacked on the thermally expansive layer 30 of the formation sheet 10 in the pattern corresponding to the unevennesses 110 so as to provide the unevennesses 110.

The thermal conversion layer 130 converts emitted electromagnetic waves into heat and discharges the heat. This heat serves to heat the thermally expansive layer 30 (that is, the thermally expandable material 32a) of the formation sheet 10 to a predetermined temperature. The temperature of the heated thermally expansive layer 30 can be adjusted by controlling a dispersion state of the thermal conversion layer 130 containing thermal conversion material (described later), that is, a concentration or density of the thermal conversion material and controlling the amount of energy of the electromagnetic waves emitted to the thermal conversion layer 130 per unit area and unit time. The thermal conversion layer 130 converts electromagnetic waves into heat at a rate higher than the other portions of the formation sheet 10, leading to selective heating of areas of the thermally expansive layer 30 adjacent to the thermal conversion layer 130.

The thermal conversion layer 130 is composed of thermal conversion material for converting absorbed electromagnetic waves into heat. Examples of the thermal conversion material particle include carbon blacks, metal hexaboride compounds, and tungsten oxide compounds. The carbon blacks can absorb electromagnetic waves, such as visible light and infrared light, and convert the electromagnetic waves into heat, for example. The metal hexaboride compounds and the tungsten oxide compounds can absorb near-infrared light and convert the light into heat. Among the metal hexaboride compounds and the tungsten oxide compounds, lanthanum hexaboride ($LaB_6$) and cesium tungsten oxide are preferred because of their high absorbance in the near-infrared range and high transmittance in the visible light range.

Figure 9:
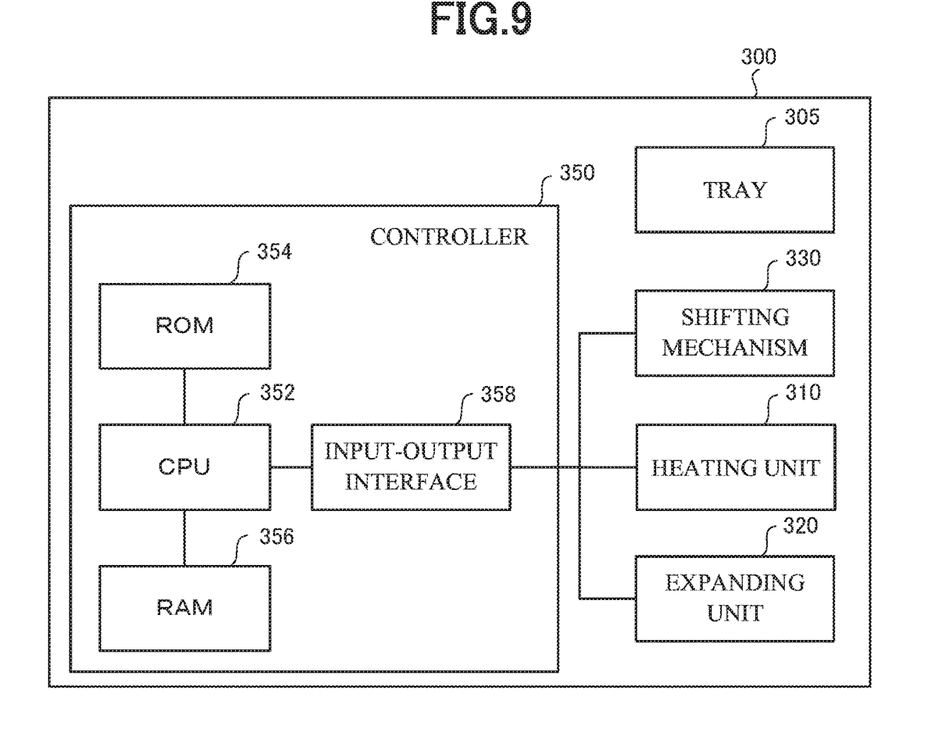
FIG. 9 illustrates a hardware configuration of a forming apparatus according to Embodiment 2 of the disclosure.
Figure 10:
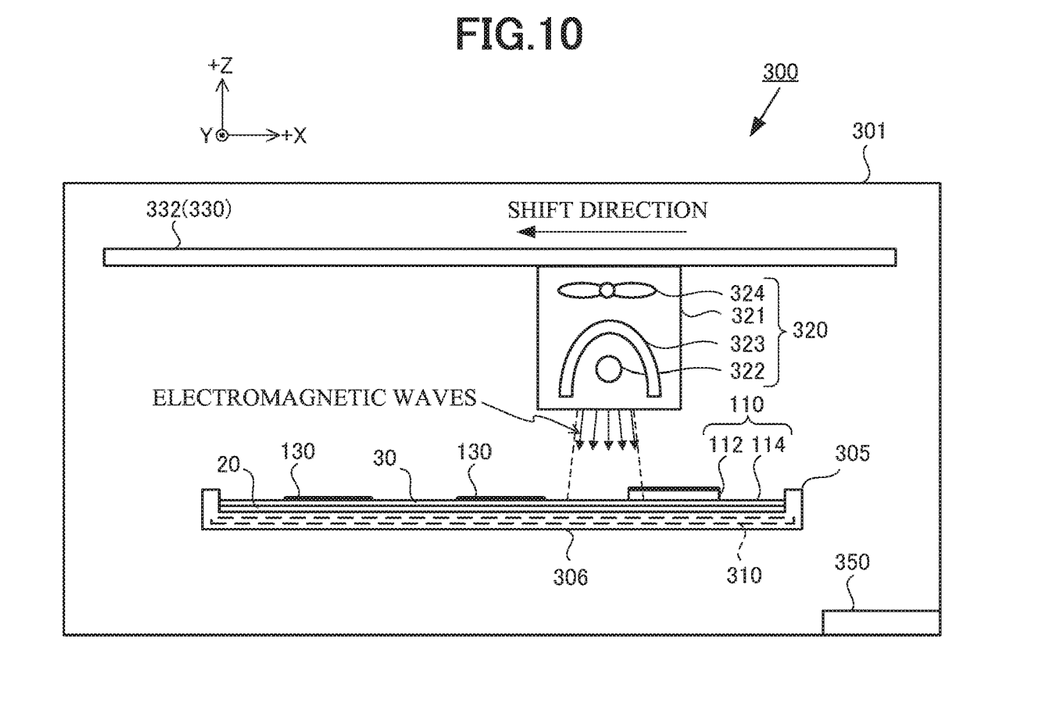
FIG. 10 is a schematic view of the forming apparatus according to Embodiment 2 of the disclosure.
Figure 11:
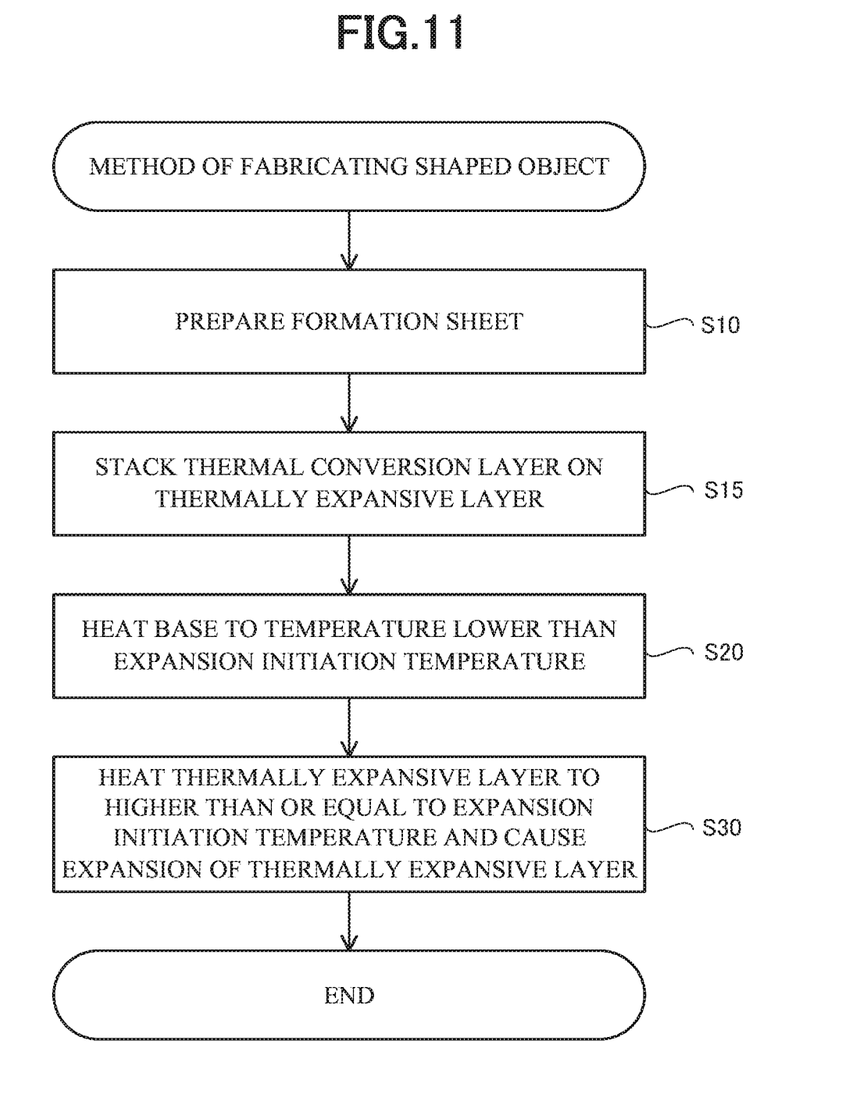
FIG. 11 is a flowchart illustrating a method of fabricating the shaped object according to Embodiment 2 of the disclosure.

A method of fabricating the shaped object 100 will now be explained with reference to FIGS. 9 to 11. In this embodiment, the shaped object 100 is fabricated from the formation sheet 10 having a shape of sheet (for example, A4-size sheet).

A forming apparatus 300 used in the method of fabricating the shaped object 100 will be described. The forming apparatus 300 fabricates the shaped object 100 from the formation sheet 10. The forming apparatus 300 according to the embodiment is equipped with a housing 301 and components accommodated therein, as illustrated in FIGS. 9 and 10. The components include a tray 305 on which the formation sheet 10 is placed, a heating unit 310 provided in the tray 305 for heating the base 20 of the formation sheet 10, an expanding unit 320 for causing expansion of the thermally expansive layer 30 of the formation sheet 10 while being shifted, a shifting mechanism 330 for shifting the expanding unit 320, and a controller 350 for controlling these components.

The tray 305 of the forming apparatus 300 aligns the formation sheet 10 placed on a bottom plate 306 to a predetermined position in the forming apparatus 300. The formation sheet 10 is placed on the bottom plate 306 of the tray 305 such that the base 20 faces the bottom plate 306.

The heating unit 310 according to the embodiment is provided in the bottom plate 306 of the tray 305 to heat the base 20 of the formation sheet 10 to a temperature lower than the expansion initiation temperature. The heating unit 310 is an electric heating element embedded in the bottom plate 306, for example.

The expanding unit 320 according to the embodiment heats the thermally expansive layer 30 of the formation sheet 10 to a temperature higher than or equal to the expansion initiation temperature while being shifted, to cause expansion of the thermally expansive layer 30. Specifically, the expanding unit 320 is shifted from the +X side toward the −X side by the shifting mechanism 330 on the +Z side of the formation sheet 10 after heating of the base 20 by the heating unit 310. The expanding unit 320 emits electromagnetic waves to the thermal conversion layer 130 stacked on the formation sheet 10 while being shifted. The expanding unit 320 thus causes the thermal conversion layer 130 to discharge heat, thereby heating the thermally expansive layer 30 of the formation sheet 10 after heating of the base 20, to a temperature higher than or equal to the expansion initiation temperature. In response to heating of the thermally expansive layer 30 to the temperature higher than or equal to the expansion initiation temperature, the thermally expandable material 32a in the thermally expansive layer 30 expands to form expanded thermally expandable material 32b, thereby causing expansion of the thermally expansive layer 30.

The expanding unit 320 is a lamp unit that emits electromagnetic waves, for example. The expanding unit 320 includes a cover 321, a lamp 322, a reflective plate 323, and a fan 324. The cover 321 accommodates the lamp 322, the reflective plate 323, and the fan 324. The lamp 322 is a straight halogen lamp. The lamp 322 can emit electromagnetic waves, for example, in the visible light range (wavelength of 380 to 750 nm), the near-infrared range (wavelength of 750 to 1,400 nm), and the mid-infrared range (wavelength of 1,400 to 4,000 nm). The electromagnetic waves from the lamp 322 are reflected by the reflective plate 323 to the thermal conversion layer 130 of the formation sheet 10. The fan 324 cools the lamp 322 and the reflective plate 323.

The shifting mechanism 330 according to the embodiment shifts the expanding unit 320 in the +X and −X directions. The shifting mechanism 330 includes a conveyance rail 332 to which the expanding unit 320 is attached, and a stepping motor (not shown) for driving the expanding unit 320, for example.

The controller 350 according to the embodiment controls the heating unit 310, the expanding unit 320, and the shifting mechanism 330. The controller 350 includes a CPU 352, a ROM 354, a RAM 356, and an input-output interface 358, like the controller 350 according to Embodiment 1. The functions of the controller 350 are achieved by execution of the programs stored in the ROM 354 by the CPU 352.

The method of fabricating the shaped object 100 according to the embodiment will be explained. FIG. 11 is a flowchart illustrating the method of fabricating the shaped object 100 according to the embodiment. The method of fabricating the shaped object 100 according to the embodiment involves a preparation step (Step S10) of preparing the formation sheet 10; a thermal conversion layer stacking step (Step S15) of stacking the thermal conversion layer 130 for converting electromagnetic waves into heat on the thermally expansive layer 30 of the formation sheet 10; a base heating step (Step S20) of heating the base 20 of the formation sheet 10 to a temperature lower than the expansion initiation temperature; and an expansion step (Step S30) of heating the thermally expansive layer 30 of the formation sheet 10 after heating of the base 20, to a temperature higher than or equal to the expansion initiation temperature, and thereby causing expansion of the thermally expansive layer 30. Since the preparation step (Step S10) according to this embodiment is identical to the preparation step (Step S10) according to Embodiment 1, the following explanation is directed to the thermal conversion layer stacking step (Step S15), the base heating step (Step S20), and the expansion step (Step S30).

In the thermal conversion layer stacking step (Step S15), an ink containing thermal conversion material is printed by a printer on the thermally expansive layer 30 of the formation sheet 10 into a dispersion pattern corresponding to the height of the protrusions 112 of the unevennesses 110 (that is, a pattern corresponding to the unevennesses 110). This process yields the thermal conversion layer 130 stacked on the thermally expansive layer 30, as illustrated in FIG. 10. A typical example of the printer is an inkjet printer.

The amount of heat discharged from the thermal conversion layer 130 depends on the concentration (or density) of the thermal conversion material and on the amount of energy of the electromagnetic waves per unit area and unit time. Accordingly, the dispersion state of the ink containing the thermal conversion material and the amount of energy of the emitted electromagnetic waves per unit area and unit time can control the shapes of the unevennesses 110 (for example, the shapes and heights of the protrusions 112 and the shapes and depths of the recesses 114).

Referring back to FIG. 11, in the base heating step (Step S20), the formation sheet 10 is installed on the tray 305 of the forming apparatus 300 according to the embodiment, and the heating unit 310 then heats the base 20 of the formation sheet 10 to a temperature lower than the expansion initiation temperature. The base 20 should preferably be heated to a temperature of at least 40° C. in order to prevent the heat for expansion of the thermally expansive layer 30 from being diffused to the base 20 in the expansion step (Step S30), also in this embodiment. Furthermore, the base 20 should preferably be heated to a temperature 5° C. or more lower than the expansion initiation temperature in order to prevent unintended expansion of the thermally expansive layer 30 in the base heating step.

In the expansion step (Step S30), while being shifted, the expanding unit 320 of the forming apparatus 300 according to the embodiment emits electromagnetic waves to the thermal conversion layer 130 of the formation sheet 10 after heating of the base 20. The thermal conversion layer 130 then discharges heat, which serves to heat the thermally expansive layer 30 of the formation sheet 10 to a temperature higher than or equal to the expansion initiation temperature, thereby causing expansion of the thermally expansive layer 30. Since the thermal conversion layer 130 is stacked in the dispersion pattern corresponding to the height of the protrusions 112, the protrusions 112 are formed on the thermally expansive layer 30 and thus define the unevennesses 110, as illustrated in FIG. 10. The preheating of the base 20 to a temperature lower than the expansion initiation temperature can prevent the heat discharged from the thermal conversion layer 130 due to electromagnetic wave irradiation from being diffused to the base 20, thereby providing higher protrusions 112, also in the method of fabricating the shaped object 100 according to the embodiment.

This process can produce the shaped object 100.

In the method of fabricating the shaped object 100 according to the embodiment, the base 20 of the formation sheet 10 is heated to the temperature lower than the expansion initiation temperature in the base heating step (Step S20). This configuration can prevent the heat for expansion of the thermally expansive layer 30 of the formation sheet 10 from being diffused to the base 20 in the expansion step (Step S30), thereby providing higher protrusions 112. The method according to the embodiment can thus readily achieve fabrication of the shaped object 100 having high protrusions 112. This heating in the base heating step (Step S20) causes softening of the binder 31 in the thermally expansive layer 30, which contributes to further increases in height of the protrusions 112.

In the forming apparatus 300 according to the embodiment, the heating unit 310 heats the base 20 of the formation sheet 10 to the temperature lower than the expansion initiation temperature. In addition, the expanding unit 320 heats the thermally expansive layer 30 of the formation sheet 10 after heating of the base 20, to a temperature higher than or equal to the expansion initiation temperature to cause expansion of the thermally expansive layer 30. The forming apparatus 300 is therefore able to prevent the heat for expansion of the thermally expansive layer 30 from being diffused to the base 20 and readily fabricate the shaped object 100 having high protrusions 112.

Embodiment 3

In the base heating step (Step S20) according to Embodiment 1 or 2, the base 20 is heated to a temperature lower than the expansion initiation temperature. The temperature of the heated base 20 may be varied for different areas of the base 20 in the base heating step (Step S20). Since the formation sheet 10 according to this embodiment is identical to the formation sheet 10 according to Embodiment 1, the following description is directed to a shaped object 100 and a method of fabricating the shaped object 100.

Figure 12:
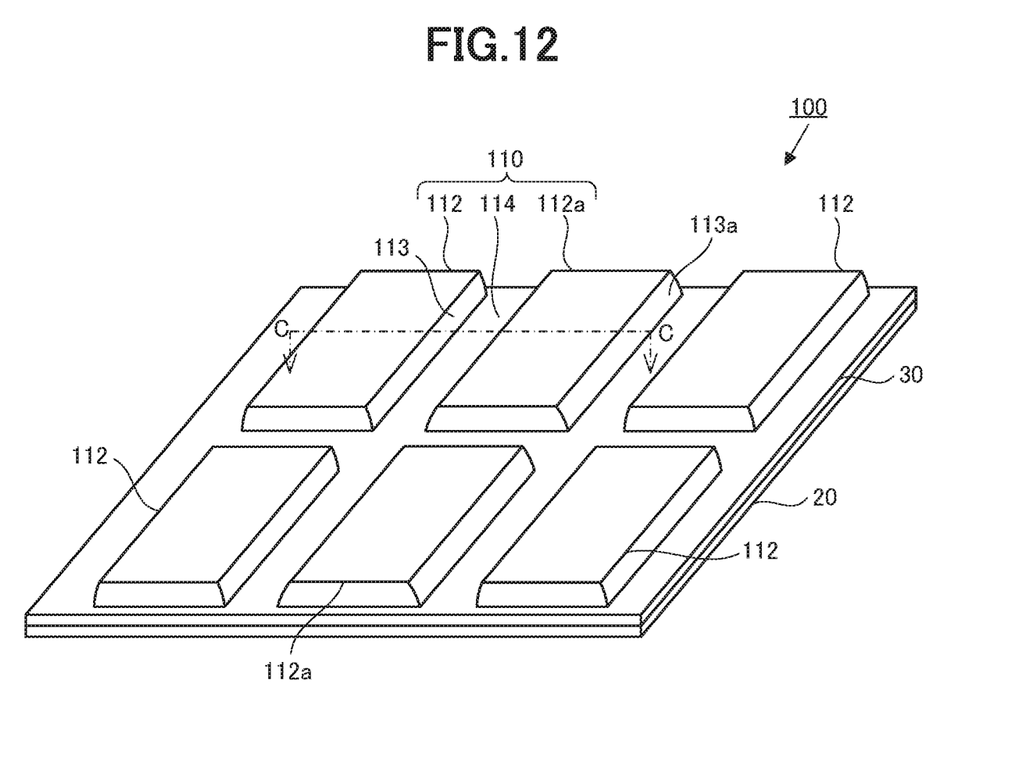
FIG. 12 is a perspective view of a shaped object according to Embodiment 3 of the disclosure.
Figure 13:
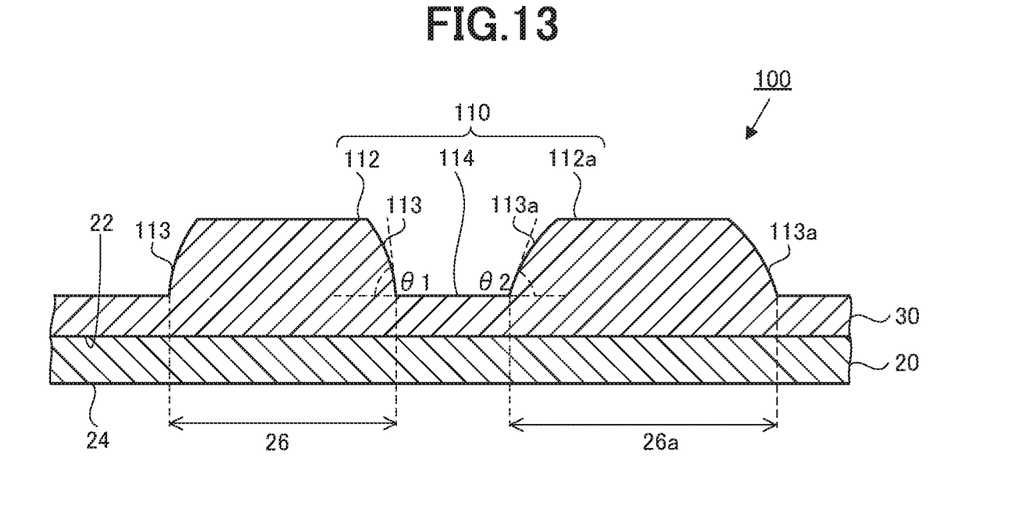
FIG. 13 is a sectional view of the shaped object illustrated in FIG. 12 as viewed along the line C-C.

With reference to FIGS. 12 and 13, the shaped object 100 according to the embodiment includes a base 20 and a thermally expansive layer 30 stacked on a first main surface 22 of the base 20 and provided with unevennesses 110 on the surface opposite to the base 20. The shaped object 100 according to the embodiment differs from the shaped object 100 according to Embodiment 1 in the configuration of the unevennesses 110. The other features of the shaped object 100 according to the embodiment are identical to those of the shaped object 100 according to Embodiment 1. It should be noted that FIG. 13 do not illustrate a binder 31, thermally expandable material 32a, or expanded thermally expandable material 32b in the thermally expansive layer 30.

The unevennesses 110 according to the embodiment are composed of protrusions 112, protrusions 112a, and recesses 114. The protrusions 112 and the recesses 114 according to the embodiment are identical to the protrusions 112 and the recesses 114 according to Embodiment 1. Each of the protrusions 112 has a shape different from that of the protrusion 112a. Specifically, an inclined surface 113a of the protrusion 112a forms an inclination angle $\theta 2$ smaller than an inclination angle $\theta 1$ of an inclined surface 113 of the protrusion 112, as illustrated in FIG. 13. The other features of the protrusion 112a are identical to those of the protrusion 112.

A method of fabricating the shaped object 100 will now be explained. In this embodiment, the shaped object 100 is fabricated from the formation sheet 10 having a shape of sheet (for example, A4-size sheet). The shaped object 100 according to the embodiment is fabricated using the forming apparatus 300 according to Embodiment 1.

Figure 14:
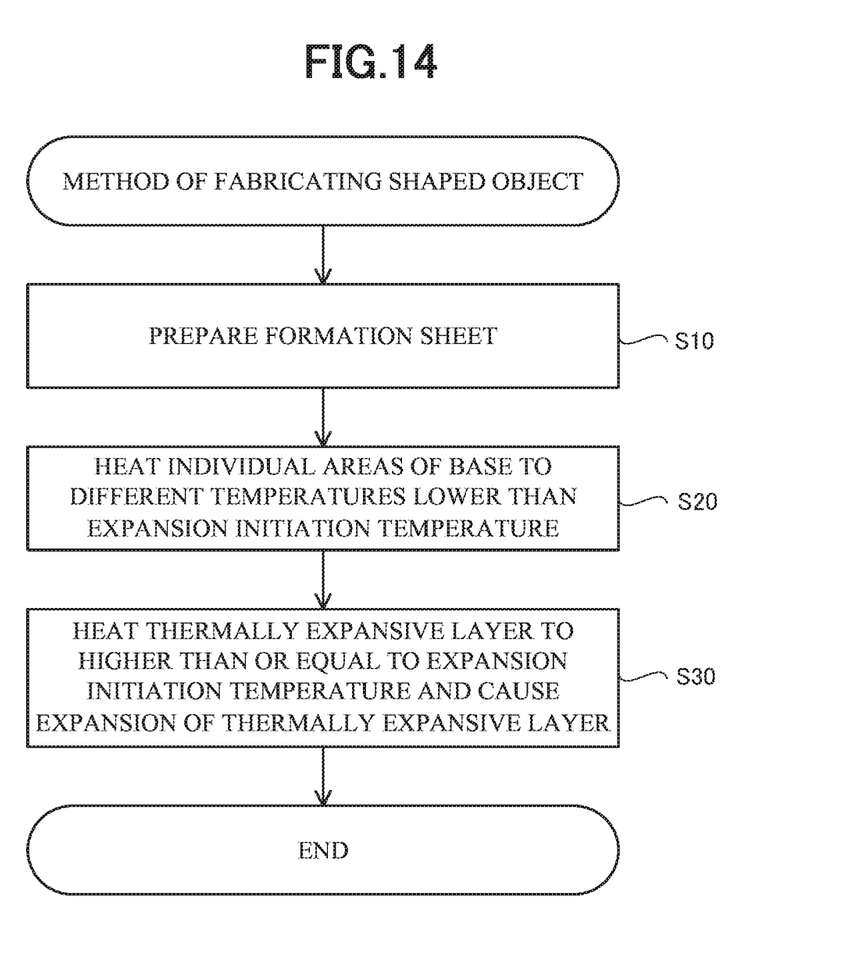
FIG. 14 is a flowchart illustrating a method of fabricating the shaped object according to Embodiment 3 of the disclosure.

FIG. 14 is a flowchart illustrating the method of fabricating the shaped object 100. The method of fabricating the shaped object 100 involves a preparation step (Step S10) of preparing the formation sheet 10; a base heating step (Step S20) of heating individual areas of the base 20 of the formation sheet 10 to different temperatures lower than the expansion initiation temperature; and an expansion step (Step S30) of heating the thermally expansive layer 30 of the formation sheet 10 after heating of the base 20, to a temperature higher than or equal to the expansion initiation temperature, and thereby causing expansion of the thermally expansive layer 30. Since the preparation step (Step S10) according to the embodiment is identical to the preparation step (Step S10) according to Embodiment 1, the following explanation is directed to the base heating step (Step S20) and the expansion step (Step S30).

In the base heating step (Step S20), while the formation sheet 10 is being conveyed, the heating unit 310 of the forming apparatus 300 emits an infrared ray to the base 20 of the formation sheet 10 to heat the base 20 to a temperature lower than the expansion initiation temperature, as in Embodiment 1. In this embodiment, the amount of energy of the infrared ray emitted to the base 20 per unit area and unit time is controlled so that individual areas of the heated base 20 have different temperatures. Specifically, first areas 26a of the base 20 corresponding to the protrusions 112a, one of which is illustrated in FIG. 13, are heated to a temperature lower than the temperature of second areas 26 of the base 20 corresponding to the protrusions 112.

Referring back to FIG. 14, in the expansion step (Step S30), while the formation sheet 10 after heating of the base 20 is being conveyed, the expanding unit 320 of the forming apparatus 300 emits a laser beam to the thermally expansive layer 30 of the formation sheet 10 after heating of the base 20, to heat the thermally expansive layer 30 to a temperature higher than or equal to the expansion initiation temperature, as in Embodiment 1. This heating causes expansion of the thermally expansive layer 30, which provides the protrusions 112, the protrusions 112a, and the recesses 114, that is, the unevennesses 110.

In this embodiment, because of the temperature of each first area 26a of the base 20 lower than the temperature of each second area 26 of the base 20, the amount of heat for providing a protrusion 112a in a third area of the thermally expansive layer 30 corresponding to the first area 26a is larger than the amount of heat for providing a protrusion 112 in a fourth area of the thermally expansive layer 30 corresponding to the second area 26. Accordingly, the heat for providing the protrusion 112a is more readily diffused than the heat for providing the protrusion 112, so that the inclination angle $\theta 2$ of the inclined surface 113a of the protrusion 112a is smaller than the inclination angle $\theta 1$ of the inclined surface 113 of the protrusion 112.

As explained above, in the base heating step (Step S20) of the method of fabricating the shaped object 100 according to the embodiment, the first area 26a and the second area 26 of the base 20 are heated to mutually different temperatures lower than the expansion initiation temperature. This configuration can provide mutually different inclination angles $\theta 1$ and $\theta 2$ of the inclined surfaces 113 and 113a of the protrusions 112 and 112a. That is, the inclination angle $\theta 1$ or θ2 of the protrusion 112 or 112a on the thermally expansive layer 30 can be adjusted by controlling the difference of the temperature of the heated base 20 from the expansion initiation temperature at which the thermally expandable material 32a starts to expand. In addition, the method of fabricating the shaped object 100 according to the embodiment can readily achieve fabrication of the shaped object 100 having high protrusions 112 and 112a, like the fabrication method according to Embodiment 1 or 2.

Modified Example

The above-described embodiments of the disclosure may be modified in various manners without departing from the gist of the disclosure.

For example, the shaped object 100 having a rolled shape may be fabricated from the formation sheet 10 having a rolled shape.

The material of the base 20 should not be limited to a thermoplastic resin and may be a paper or fabric, for example. The thermoplastic resin constituting the base 20 should not be limited to polyolefin resins and polyester resins and may be polyamide resins, polyvinyl chloride (PVC) resins, and polyimide resins, for example.

Although the thermal conversion layer 130 is stacked on the thermally expansive layer 30 of the formation sheet 10 according to Embodiment 2, the thermal conversion layer 130 may be stacked on the second main surface 24 of the base 20 of the formation sheet 10. Alternatively, the thermal conversion layer 130 may be stacked on a release layer mounted on the second main surface 24 of the base 20 or the thermally expansive layer 30. This configuration enables the thermal conversion layer 130 to be removed from the shaped object 100 by peeling the release layer from the shaped object 100.

The formation sheet 10 or the shaped object 100 may further include an additional layer composed of any material between the adjacent layers. For example, the base 20 and the thermally expansive layer 30 may be provided with an adhesive layer therebetween for enhancing the adhesion between the base 20 and the thermally expansive layer 30. The adhesive layer may be composed of a surface modifier, for example.

The shaped object 100 may be provided with a color image printed thereon. For example, the shaped object 100 according to Embodiment 1 may be provided with a color ink layer on the thermally expansive layer 30. This color ink layer is composed of inks of four colors (cyan, magenta, yellow, and black) and represents a color image.

Figure 15:
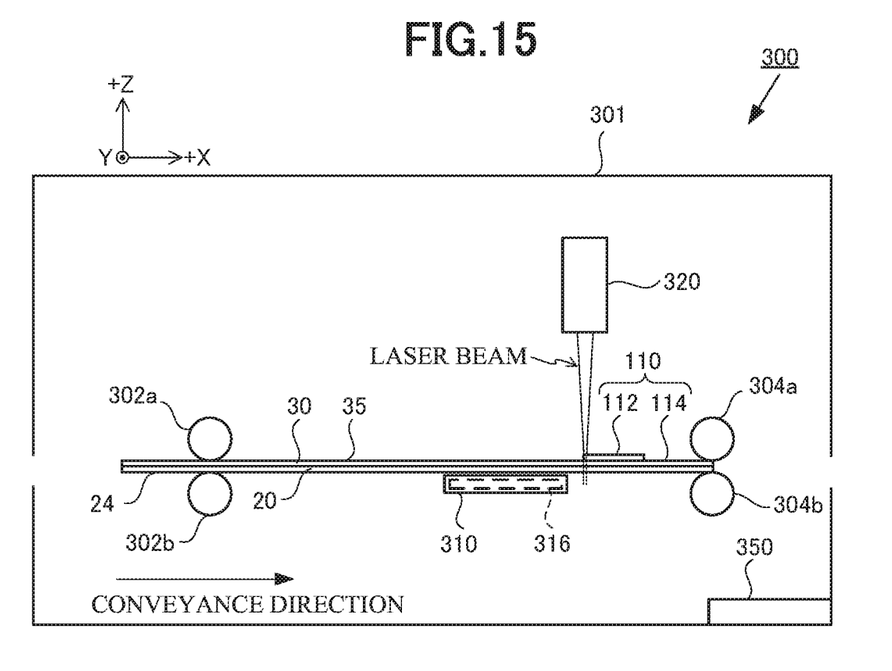
FIG. 15 is a schematic view of a forming apparatus according to a modified example of the disclosure.

Although the heating unit 310 of the forming apparatus 300 according to Embodiment 1 emits an infrared ray to heat the base 20 of the formation sheet 10 to a temperature lower than the expansion initiation temperature, the heating unit 310 of the forming apparatus 300 according to Embodiment 1 may have other configuration. For example, the heating unit 310 of the forming apparatus 300 according to Embodiment 1 may be a heater equipped with an electric heating element 316, as illustrated in FIG. 15. The heating unit 310 is located on the −Z side of the conveyance path of the formation sheet 10. While the formation sheet 10 is being conveyed on the +Z side of the heating unit 310, the heating unit 310 heats the base 20 of the formation sheet 10 to a temperature lower than the expansion initiation temperature.

Figure 16:
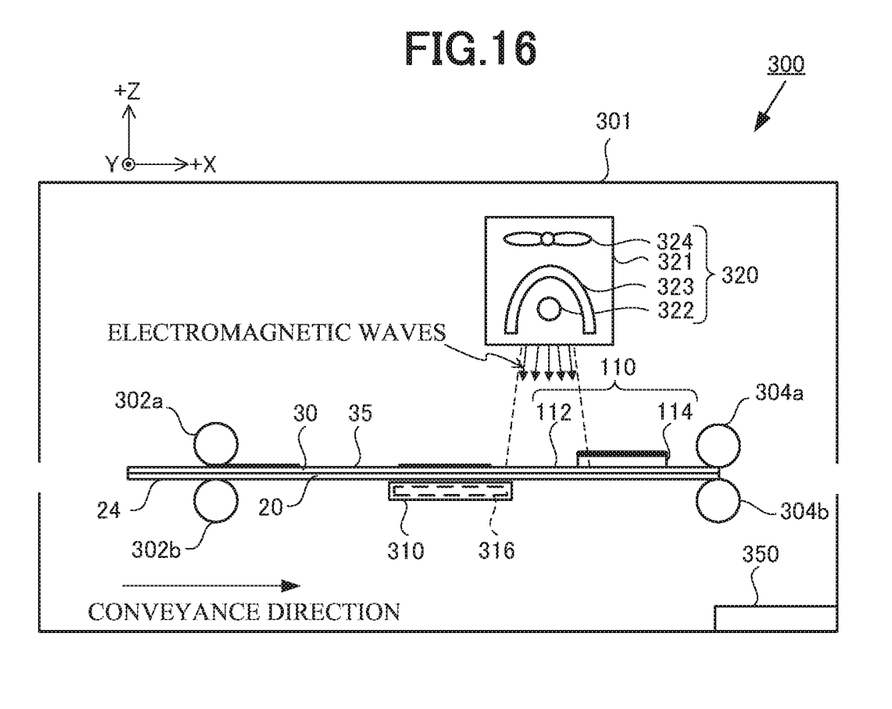
FIG. 16 is a schematic view of a forming apparatus according to another modified example of the disclosure.

Although the formation sheet 10 provided with the thermal conversion layer 130 thereon is installed on the tray 305 in the forming apparatus 300 according to Embodiment 2, the formation sheet 10 provided with the thermal conversion layer 130 thereon may be conveyed. For example, as illustrated in FIG. 16, the forming apparatus 300 may include conveyance rollers 302a, 302b, 304a, and 304b instead of the tray 305, and include a heater equipped with an electric heating element 316 as the heating unit 310. The conveyance rollers 302a, 302b, 304a, and 304b convey the formation sheet 10, as in Embodiment 1. The heating unit 310 is located on the −Z side of the conveyance path of the formation sheet 10. While the formation sheet 10 is being conveyed on the +Z side of the heating unit 310, the heating unit 310 heats the base 20 of the formation sheet 10 to a temperature lower than the expansion initiation temperature.

The expanding unit 320 of the forming apparatus 300 according to Embodiment 2 should not be limited to the lamp that emits electromagnetic waves and may be a laser emitter.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A method of fabricating a shaped object, the method comprising:
preparing a formation sheet comprising a base and a thermally expansive layer stacked on a first main surface of the base, the thermally expansive layer including a binder and thermally expandable material;
performing a base heating process comprising heating the base of the formation sheet to a temperature lower than an expansion initiation temperature at which the thermally expandable material starts to expand; and
performing an expansion process comprising heating the thermally expansive layer of the formation sheet after heating of the base, to a temperature higher than or equal to the expansion initiation temperature at which the thermally expandable material starts to expand, thereby causing expansion of the thermally expansive layer,
wherein:
in the base heating process, said heating the base of the formation sheet comprises heating a first area of the base to a first temperature lower than the expansion initiation temperature and heating a second area of the base to a second temperature lower than the expansion initiation temperature, wherein the first temperature is lower than the second temperature, whereby, in the expansion process, expansion of a third area of the thermally expansive layer corresponding to the first area of the base requires an amount of heat larger than an amount of heat for expansion of a fourth area of the thermally expansive layer corresponding to the second area of the base, and
the expansion process is performed after said heating the first area of the base to the first temperature and said heating the second area of the base to the second temperature in the base heating process, thereby causing a protrusion in the third area of the thermally expansive layer after expansion to have an inclination angle smaller than an inclination angle of a protrusion in the fourth area of the thermally expansive layer after expansion, and the base heating process and the expansion process are performed such that the protrusion formed in the third area of the thermally expansive layer expanded in the expansion process and the protrusion formed in the fourth area of the thermally expansive layer expanded in the expansion process have substantially a same height as each other above the base.

2. The method of fabricating the shaped object according to claim 1, further comprising:

stacking a thermal conversion layer on the thermally expansive layer or a second main surface of the base opposite to the first main surface, the thermal conversion layer converting electromagnetic waves into heat, wherein the electromagnetic waves are emitted to the thermal conversion layer in the expansion process.

3. The method of fabricating the shaped object according to claim 1, wherein the base is heated by a heater in the base heating process.

4. The method of fabricating the shaped object according to claim 1, wherein the inclination angle of each of the protrusions on the thermally expansive layer after expansion is adjusted by controlling, in the base heating process, a difference of a temperature of the heated base from the expansion initiation temperature at which the thermally expandable material starts to expand.

5. The method of fabricating the shaped object according to claim 1, wherein:

the base is heated by a heater in the base heating process, and the thermally expansive layer is heated by being irradiated with a laser beam in the expansion process.

6. The method of fabricating the shaped object according to claim 1, wherein, in the base heating process, the base is heated to a temperature 5° C. or more lower than the expansion initiation temperature at which the thermally expandable material starts to expand in the expansion process.

7. A forming apparatus for fabricating a shaped object from a formation sheet including a base and a thermally expansive layer stacked on a first main surface of the base, the thermally expansive layer including a binder and thermally expandable material, the forming apparatus comprising:

a heating unit configured to perform a base heating process comprising heating the base of the formation sheet to a temperature lower than an expansion initiation temperature at which the thermally expandable material starts to expand; and an expanding unit configured to perform an expansion process comprising heating the thermally expansive layer of the formation sheet to a temperature higher than or equal to the expansion initiation temperature at which the thermally expandable material starts to expand, thereby causing expansion of the thermally expansive layer, wherein:

in heating the base of the formation sheet in the base heating process, the heating unit is configured to heat a first area of the base to a first temperature lower than the expansion initiation temperature and heat a second area of the base to a second temperature lower than the expansion initiation temperature, wherein the first temperature is lower than the second temperature, whereby, in the expansion process performed by the expanding unit, expansion of a third area of the thermally expansive layer corresponding to the first area of the base requires an amount of heat larger than an amount of heat for expansion of a fourth area of the thermally expansive layer corresponding to the second area of the base, and the expanding unit is configured to perform the expansion process after said heating the first area of the base to the first temperature and said heating the second area of the base to the second temperature in the base heating process performed by the heating unit, thereby causing a protrusion in the third area of the thermally expansive layer after expansion to have an inclination angle smaller than an inclination angle of a protrusion in the fourth area of the thermally expansive layer after expansion, and wherein the heating unit is configured to perform the base heating process and the expansion unit is configured to perform the expansion process such that the protrusion formed in the third area of the thermally expansive layer expanded in the expansion process and the protrusion formed in the fourth area of the thermally expansive layer expanded in the expansion process have substantially a same height as each other above the base.

8. The forming apparatus according to claim 7, wherein the formation sheet further includes a thermal conversion layer on the thermally expansive layer or a second main surface of the base opposite to the first main surface, the thermal conversion layer converting electromagnetic waves into heat, and the expanding unit emits the electromagnetic waves to the thermal conversion layer.

9. The forming apparatus according to claim 7, further comprising:

conveyance rollers configured to convey the formation sheet along a conveyance path, wherein the heating unit comprises a heater, the expanding unit comprises a lamp, and the heater and the lamp are disposed along the conveyance path in order of the heater and the lamp from an upstream side to a downstream side of the conveyance path.

10. The forming apparatus according to claim 7, wherein, in the base heating process, the heating unit heats the base to a temperature 5° C. or more lower than the expansion initiation temperature at which the thermally expandable material starts to expand.

* * * * *